(No Model.) 7 Sheets—Sheet 1.
W. L. LANGLEY.
COTTON HARVESTER.

No. 372,918. Patented Nov. 8, 1887.

Fig. 1.

WITNESSES:
A. E. Eader
John E. Morris.

INVENTOR:
Wm L. Langley
BY Chas B. Mann
ATTORNEY.

(No Model.) 7 Sheets—Sheet 2.

W. L. LANGLEY.
COTTON HARVESTER.

No. 372,918. Patented Nov. 8, 1887.

Fig. 2.

WITNESSES:
A. E. Eader
John E. Morris.

INVENTOR:
Wm L. Langley
BY Chas B. Mann
ATTORNEY.

(No Model.) 7 Sheets—Sheet 3.
W. L. LANGLEY.
COTTON HARVESTER.

No. 372,918. Patented Nov. 8, 1887.

WITNESSES: INVENTOR:
A. E. Eader Wm L. Langley
John E. Morris
BY Chas B. Mann
ATTORNEY.

(No Model.) 7 Sheets—Sheet 4.

W. L. LANGLEY.
COTTON HARVESTER.

No. 372,918. Patented Nov. 8, 1887.

WITNESSES:
A. E. Eader
John E. Morris

INVENTOR:
Wm L. Langley
BY Chas B. Mann
ATTORNEY.

(No Model.) 7 Sheets—Sheet 6.

W. L. LANGLEY.
COTTON HARVESTER.

No. 372,918. Patented Nov. 8, 1887.

WITNESSES:
A. C. Eader
John E. Morris

INVENTOR:
Wm L. Langley
BY Chas B. Mann
ATTORNEY.

UNITED STATES PATENT OFFICE.

WILLIAM L. LANGLEY, OF NEWARK, NEW JERSEY, ASSIGNOR TO THE LANGLEY COTTON HARVESTER COMPANY OF NEW YORK CITY.

COTTON-HARVESTER.

SPECIFICATION forming part of Letters Patent No. 372,918, dated November 8, 1887.

Application filed October 5, 1886. Serial No. 215,339. (No model.)

*To all whom it may concern:*

Be it known that I, WILLIAM L. LANGLEY, a citizen of the United States, residing at Newark, in the county of Essex and State of New Jersey, have invented certain new and useful Improvements in Cotton-Harvesters, of which the following is a specification.

This invention relates to a machine for picking cotton from the bolls of the plant in the field.

The object of the invention is to provide for this purpose an efficient machine to be drawn or propelled through the field by horse or other motive power.

The invention is illustrated in the accompanying drawings, in which—

Fig. 3 is an elevation of a portion of a stationary frame which each compartment is provided with.

The letter A designates two wheels on which the machine is supported and carried, and B an arched or "crank" axle connecting these wheels.

Figure 8:
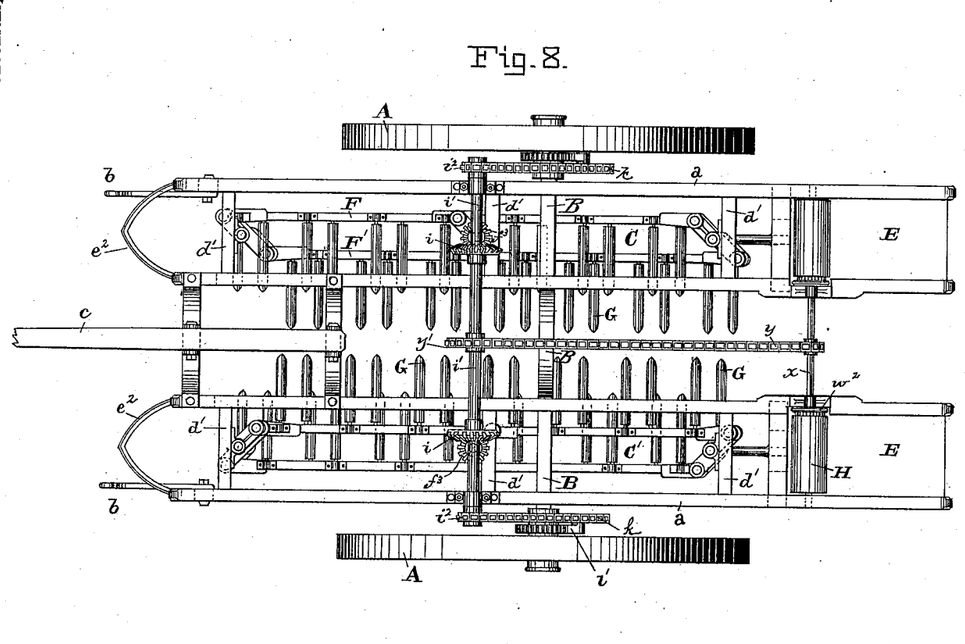
Fig. 8 is a top plan of the machine.
Figure 9:
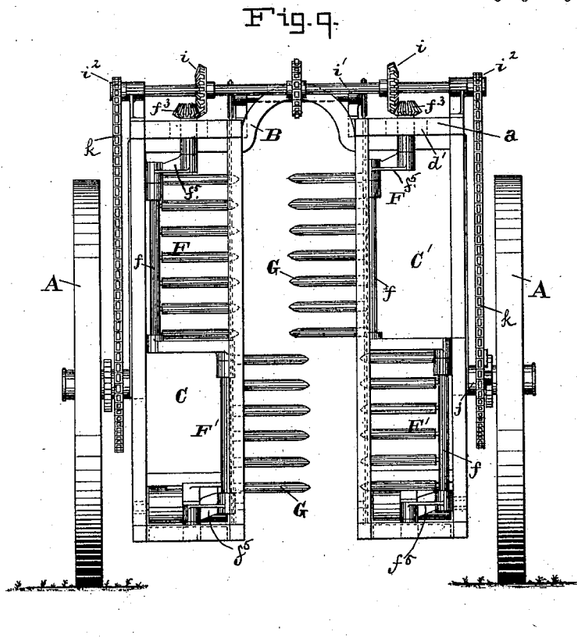
Fig. 9 is a front end elevation of the machine as seen when the tongue and fenders are removed.

As here organized, the machine embraces two picking-compartments, C C', though the several features of the invention may be used and are operative in a machine embracing but one compartment. The top *a* of the frame of each of the picking-compartments C C' rests upon the flat elevated parts of the crank-axle B, and said compartments are suspended therefrom. The two compartments, as shown in Figs. 8 and 9, are parallel with each other, and a space separates them and extends lengthwise between them. When the machine in the field is moved along a row of cotton-plants, the latter take position in the said separating-space. In other words, one picking-compartment, C, passes along one side of the row of plants, and the other, C', along the opposite side of the same row, whereby the cotton is picked from both sides at the same time. A hook, *b*, at each side of the front is for the attachment of a singletree, it being contemplated that two animals will be employed to draw the machine. A tongue, *c*, is at the top and projects forward, and is employed to steady the machine and to guide it.

Each picking-compartment has its outer side, *d*, closed by a wall of sheet-metal or any other material, and its inner side consists of a frame of stationary bars, *e*. (See Figs. 2, 3, 5, and 6.) These bars may be horizontal, or slightly inclined from a horizontal. The latter is preferred. They have position one above the other, with an open space, *e'*, between each two bars.

Figure 1:
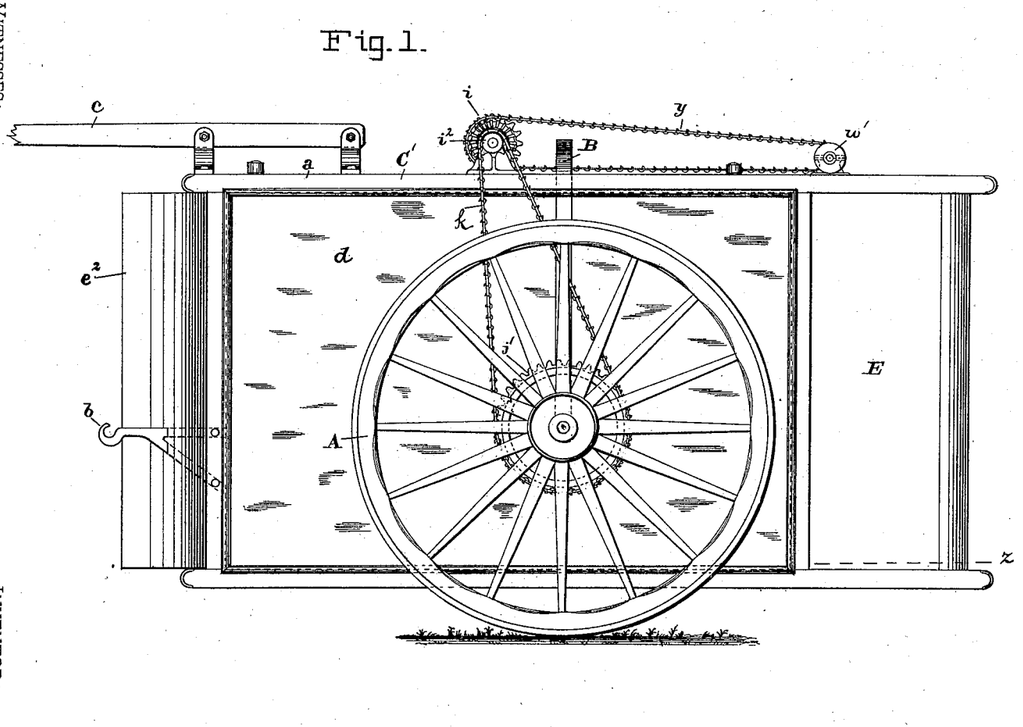
Figure 1 is a side elevation of the machine.

Each picking-compartment has for a bottom an endless belt, D, upon which the picked cotton drops, and by which it is conveyed away, as hereinafter described. The two sides of the picking-compartment (the outer side, *d*, and the inner side, which has the bars *e*) are connected at the top by cross-bars *d'*. The front end of the picking-compartment is closed by a suitable fender, $c^2$, (see Figs. 1, 2, and 8,) and at the rear end is a separate receptacle, E, in which the picked cotton is stored by the aforesaid endless belt D.

Figure 2:
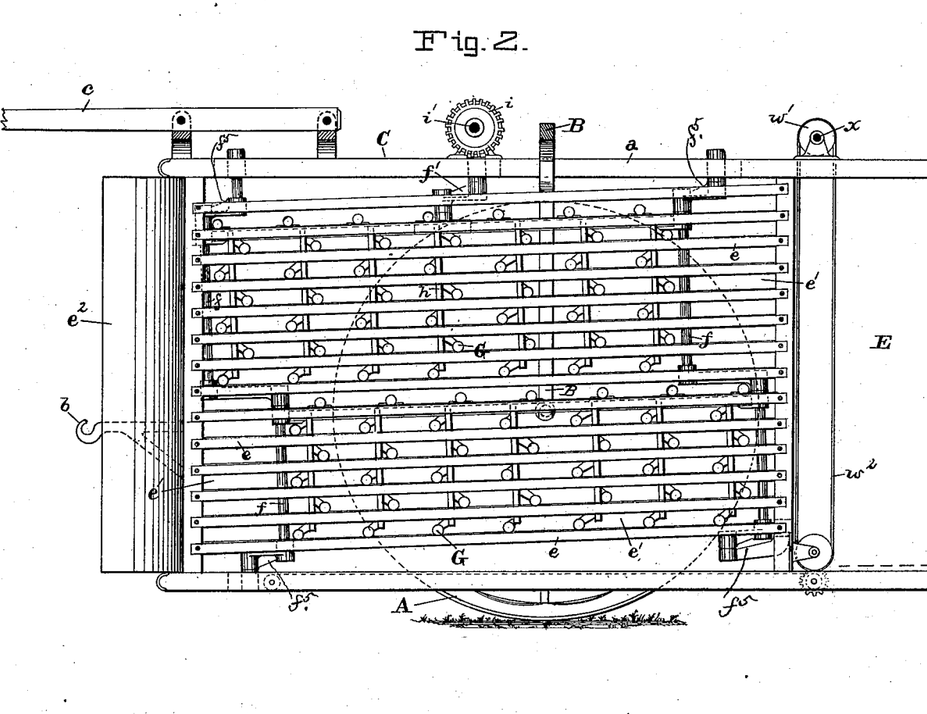
Fig. 2 is an elevation of the picking or operative side of one of the picking-compartments of the machine, two such compartments being employed, as will be seen in the top and end views, respectively shown in Figs. 8 and 9.
Figure 3:
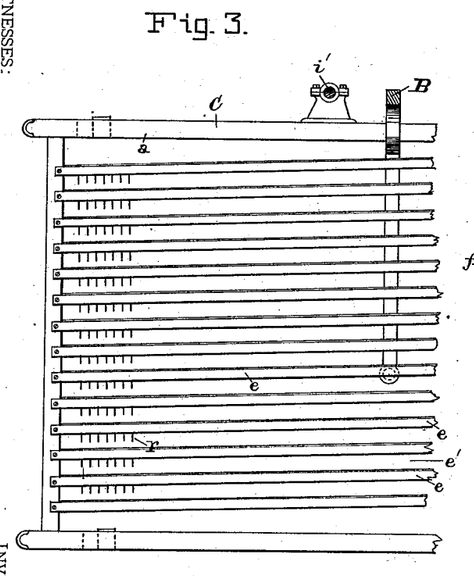
Figure 4:
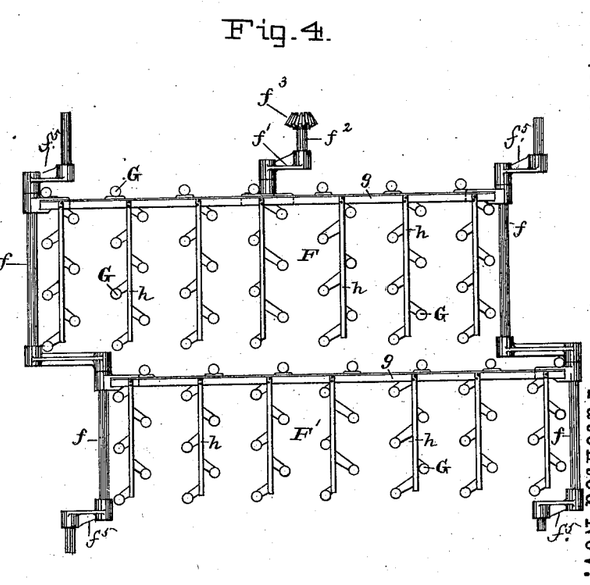
Fig. 4 is a side view of the picker-frames for one compartment and the crank mechanism whereby movement is imparted to them.
Figure 5:
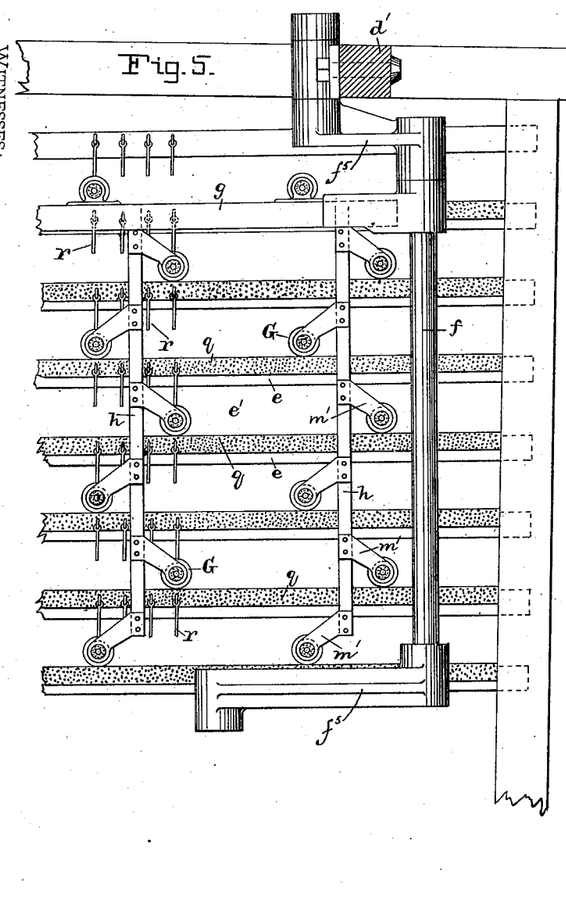
Fig. 5 is an inner side view of a portion of one of the compartments, showing the mechanism as seen when looking toward that side which comes next to the cotton-plant.

Two movable picker-frames, F and F', are mounted one above the other in each picking-compartment. These picker-frames are attached to two crank-shafts having cranks $f^5$ and wrists $f$, as seen in Figs. 2, 4, and 9. The crank-shafts are mounted in fixed or stationary bearings in the picking-compartments, and should have a position at right angles to the stationary bars $e$. In the present instance each picker-frame consists of a bar, $g$, extending from one wrist $f$ to the other, and any number of upright bars $h$ (one or more) attached to the said bar $g$. The picker-stems G are attached to the frame and project horizontally therefrom.

Figure 10:
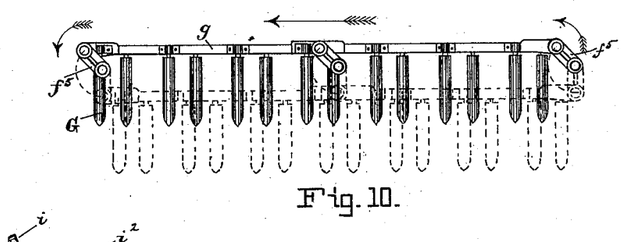
Fig. 10 is a view illustrating the movement of the picker-frames.

The particular construction here shown and described of the picker-frames (the bars $g$ and $h$) is not essential. It is obvious they may be otherwise constructed, and while two upright crank-shafts are here shown more than two may be used. The bar $g$ of the top picker-frame has a drive-crank, $f'$, located intermediate of the two upright crank-shafts $f^5$. The shaft $f^2$ of this drive-crank has its bearings on one of the top cross-bars, $d'$, and carries a bevel-pinion, $f^3$, which gears with a wheel, $i$, on a shaft, $i'$, extending across the top of the machine. The cross shaft $i'$ at each end has a sprocket-wheel, $i^2$, and the hubs $j$ of the wheels A also have sprocket-wheels $j'$. A drive-chain, $k$, connects the wheel on the hub with the wheel $i^2$ on the cross-shaft, and thereby, when the machine is drawn forward, a parallel reciprocating movement is imparted to the picker-frames F and F', as illustrated by broken lines in Fig. 10. This parallel reciprocating movement is in a plane slightly inclined from the direction in which the machine is traveling. This movement, however, may be in a horizontal plane. When the upper picker-frame, F, moves toward the row of cotton-plants, the lower picker-frame, F', moves back, or away therefrom.

Figure 11:
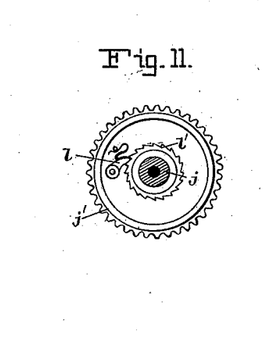
Fig. 11 is a view of the ratchet device connected with each supporting or carriage wheel.

In order to throw the picker-frames out of gear with respect to the wheels A, so that the machine may be drawn forward without the said frames moving, as well as to permit the machine, when in the field, to be backed, the sprocket-wheel $j'$ turns loosely, and is provided with a pawl, $l$, while the hub $j$ has a fixed ratchet-wheel, $l'$. (See Figs. 9 and 11.)

Figures 6, 7:
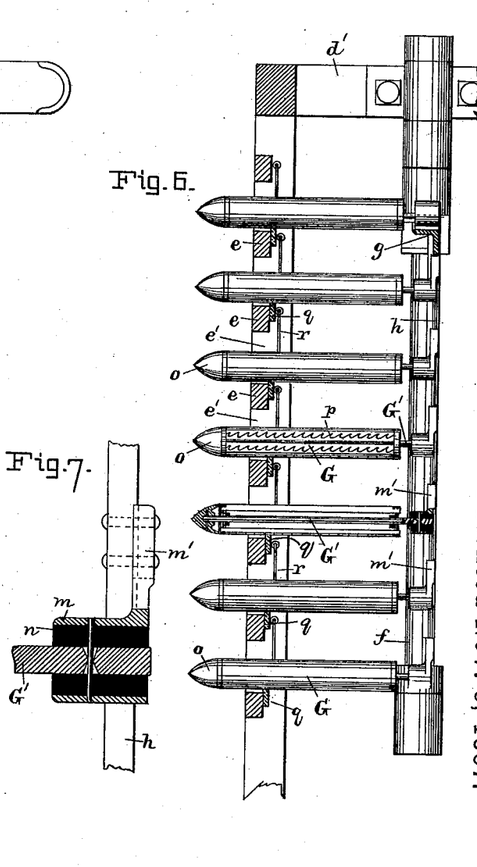
Fig. 6 is a vertical section of the parts shown in Fig. 5, and comprises the picking mechanism of one compartment.
Fig. 7 is a section of one of the elastic sockets by means of which the journal of each picker-stem is flexibly attached to the picker-frame.

The construction of the picker-stems G, which extend horizontally from the picker-frames F and F', may vary from that shown in Fig. 6. In fact, a machine organized and operating as the one herein described may use picker-stems of various constructions. One desirable feature is here shown, which consists of the flexible attachment of the picker-stem G to the picker-frame F, and is illustrated in Figs. 6 and 7. This flexible attachment embraces a metal socket, $m$, on the arm $m'$, which is secured to the upright bar $h$ of the frame, and this metal socket is filled with rubber, $n$, or similar elastic material. The shank or spindle G' of the picker-stem fits in the rubber filling $n$, and is suitably secured, whereby, as the fastening is elastic, the free end of the picker-stem G may yield laterally in any direction, and thereby when it comes in contact with the stiff part of the stalk of the cotton-plant said picker-stem may readily yield.

The picker-stems G in this machine are designed to turn loosely on their shanks or spindles G', and said stems have a conical cap, $o$, and hooked teeth $p$, all of which latter point circumferentially in the same direction, and also rearwardly, or away from the conical cap, (see Fig. 6,) and when picking the cotton each picker-stem is free to be revolved on its spindle G' in the same direction that the teeth $p$ point.

As already stated, the picker-stems G extend from the picker-frames horizontally, and when moved toward the cotton plant the stems have position in the open spaces $e'$ between the stationary bars $e$. These bars $e$ have their upper surfaces provided with rubber or gum, $q$. In the present instance each bar has a strip, $q$, of rubber secured to it, (see Figs. 5 and 6,) and when the picker-stems G project between these bars they rest upon and are in contact with the said rubber or gum surfaces. The object of the rubber or gum on the bars is to produce sufficient friction on the moving picker-stems to insure their revolution when the picker-stems are projected toward the cotton-plant. As long as the picker-stems are moving while in contact with the rubber or gum, they will revolve, provided the plant offers no obstruction to their revolution. As the picker-stems are revolved merely by the friction induced by the rubber on the bars, their revolution may stop without injury to them or to the picking operation.

An important end to the operation of this machine is effected by the combination above described—namely: The parallel reciprocating movement of the picker-frames causes the picker-stems G, while being projected toward the cotton-plant and at the same time rearwardly, to be revolved in the direction in which the teeth point, whereby the teeth will catch in the cotton fiber and drag or twist it from the boll, and when the picker-stems have been withdrawn from the cotton-plant and into the compartment their revolution ceases, and, as already stated, should anything stop the picker-stems from revolving no injury will result. The picked cotton, it will be understood, is drawn through the spaces $e'$ into the compartment.

To insure the prompt removal from the picker-stems of the picked cotton, stripping-pins $r$ are employed. These pins $r$ are shown plainly in Figs. 5 and 6. They hang pendent from the stationary bars $e$ upon their inner sides, and their lower ends, which project below said bars, are free to move laterally in any direction. While the picker-stems are being withdrawn from the cotton-plant the pendent pins $r$ yield and offer no hinderance to the cotton as it is drawn into the compartment; but when the picker-stems again start forward toward the cotton-plant the pendent pins $r$ come into play and serve to strip the adhering cotton from them, and this cotton then falls onto an endless belt, D, which forms the bottom of each compartment, and by this belt the cotton is conveyed into the receptacle E at the rear of the machine.

The description thus far of the picking mechanism has been confined to one compartment, C. It is proper here to state that this mechanism is duplicated, a set being in each of the two compartments C and C'. A feature, however, consists of the coaction between the two sets of mechanism, to-wit, the movement of the mechanism in one compartment is timed with respect to that in the other by means of the cross-shaft $i'$ and gearing at the top of the machine, and the result is that as the upper picker-frame, F, in the compartment C moves toward the row of cotton-plants the upper picker frame, F, in the other compartment C', recedes or withdraws from the said row of plants, and the same is true of the lower picker-frames, F'. By this means the picker-stems on opposite sides of the same row of plants are never in conflict with each other.

Figures 12, 13, 14, 15:
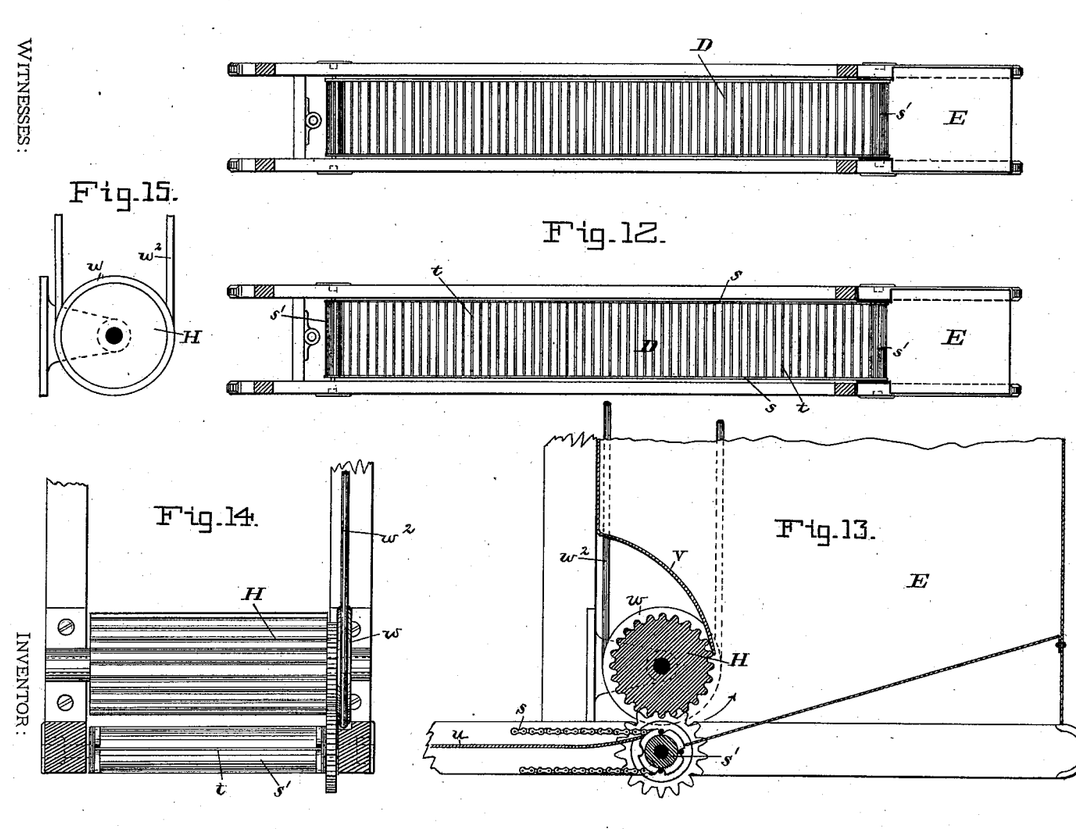
Fig. 12 is a horizontal section of the compartments on the line *z z* of Figs. 1 and 2.
Figs. 13 and 14 show the receptacle for the picked cotton and the mechanism by which the said cotton is delivered into it.
Fig. 15 shows a modification of the feed-roller H.

The position of the endless belt D, receptacle E, and co-operating parts is shown plainly in Figs. 12, 13, and 14. The endless belt D consists of two chains, $s$, and cross wires or rods, $t$, connecting the chains. This belt runs over two rollers, $s'$, one being located at each end of the compartment. A suitable board or plate, $u$, (see Fig. 13,) is fixed to the lower frame of the compartment and has position between the upper and lower surface or stretch of the belt. This board $u$ prevents the loss of any cotton that may pass between the wires or rods $t$ of the upper stretch of the belt. A roller, H, is mounted at the side of the receptacle E and near its bottom, and above the roller $s'$, and is geared therewith. The space between the two rollers comprises an opening into the receptacle E, and the picked cotton falling on the belt D is carried to and forced between the said two rollers H and $s'$. As the picked cotton passes between these two rollers it is compressed and enters the bottom of the receptacle E. This force-feed method of feeding the cotton into the bottom of the receptacle causes it to be packed closely therein, whereby a greater quantity may be carried before there is a necessity to empty it. A suitable shield or cover, $v$, above the roller H, prevents the cotton from working out back of said roller. The roller H in each compartment has at one end a pulley, $w$, and a shaft, $x$, at the top of the compartment, extends across the space between the two compartments. This shaft $x$ is driven by a chain, $y$, which passes over a pulley, $y'$, on the top cross-shaft, $i'$. The shaft $x$ has at each end a pulley, $w'$, and a chain or strap, $w^2$, connects the upper pulley, $w'$, with a pulley, $w$, on the roller. By this construction movement is imparted to the rollers H and $s'$ and to the endless belt D in both compartments.

In Figs. 13 and 14 the roller H is shown with corrugations, while in Fig. 15 this roller is shown plain, or without corrugations. Either form of roller may be used to effect the "force-feed" in the above-described combination.

I do not here claim the particular form of picker-stem shown, as the same forms the subject-matter of another application for a patent filed December 20, 1886, No. 222,116.

It is obvious that many details of construction here shown may be modified and changed, and that some parts may be used while omitting others or substituting equivalents therefor, without departing from the invention as set forth in the claims.

Having described my invention, I claim and desire to secure by Letters Patent of the United States—

1. In a cotton-harvester, the combination of a picker-frame having a metal socket filled with rubber or similar elastic material, and picker-stems G, having shanks or spindles secured in said elastic material, for the purpose set forth.

2. In a cotton-harvester, the combination of a picker-frame having a metal socket filled with rubber or similar elastic material, picker-stem shanks or spindles secured in said elastic material, and picker-stems free to revolve on said shanks or spindles, for the purpose set forth.

3. In a cotton-harvester, the combination of an upright stationary frame composed of bars $e$, with an open space, $e'$, between each two bars, a rubber or gum surface attached to said bars, and picker-stems interposed between the bars in the spaces $e'$, and said stems adapted to have a revolving motion when moved in contact with said rubber or gum of said bars, as shown and described.

4. In a cotton-harvester, the combination of an upright stationary frame composed of bars $e$, with open spaces $e'$ between each two bars, the crank-shafts having cranks $f^5$ and wrists $f$, picking-frames F F', attached to the said wrists, picker-stems G on the picking-frames which move toward the cotton in the open spaces $e'$, and the stripping-pins $r$, having their upper ends loosely connected to the said bars $e$, the said pins being adapted to strip the cotton from the picker-stems, substantially as shown and described.

5. In a cotton-harvester, the combination of an upright stationary frame composed of bars $e$, having spaces $e'$ between said bars, a rubber or gum surface attached to the said bars, a picking-frame having picker-stems which move toward the cotton-plant in the said open spaces and bearing against and rotated by said rubber surfaces as they are moved, and the stripping-pins having their upper ends loosely connected to the said rubber bars and adapted to strip the cotton from the picker-stems, as set forth.

In testimony whereof I affix my signature in the presence of two witnesses.

WILLIAM L. LANGLEY.

Witnesses:
JOHN E. MORRIS,
JNO. T. MADDOX.